US007499158B2

(12) United States Patent
Flemming et al.

(10) Patent No.: US 7,499,158 B2
(45) Date of Patent: Mar. 3, 2009

(54) POSITIONABLE CALIBRATION TARGET FOR A DIGITAL PRINTER OR IMAGE SCANNER

(75) Inventors: Richard W. Flemming, Rochester, NY (US); Timothy D. Turner, Pittsford, NY (US); Wayne C. Powley, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 378 days.

(21) Appl. No.: 11/514,014

(22) Filed: Aug. 31, 2006

(65) Prior Publication Data

US 2008/0056737 A1 Mar. 6, 2008

(51) Int. Cl.
*G01J 1/10* (2006.01)

(52) U.S. Cl. .................. 356/243.4; 356/243.1; 356/455

(58) Field of Classification Search ................. 356/455, 356/243.1, 243.4, 243.5; 382/112
See application file for complete search history.

(56) References Cited

U.S. PATENT DOCUMENTS 5,280,368 A * 1/1994 Fullerton .................... 358/474
5,488,458 A 1/1996 Benedict et al.
6,198,536 B1 3/2001 Baker
6,324,353 B1 11/2001 Laussermair et al.
6,351,308 B1 * 2/2002 Mestha ........................ 356/402
6,684,035 B2 1/2004 Furno et al.

* cited by examiner

*Primary Examiner*—Roy M Punnoose
(74) *Attorney, Agent, or Firm*—R. Hutter

(57) ABSTRACT

A structure for calibrating an image sensor or other photosensor includes a baffle for passage of a sheet therethrough. A photosensor is disposed to receive light reflected from a sheet passing through the baffle. A selectably-positionable target member has a target surface associated therewith, and is positionable in one position establishing a width of the baffle suitable for passage of a sheet through the baffle, and another position wherein the first target surface is disposed adjacent to the photosensor.

11 Claims, 3 Drawing Sheets

POSITIONABLE CALIBRATION TARGET FOR A DIGITAL PRINTER OR IMAGE SCANNER

TECHNICAL FIELD

The present disclosure relates to digital printing apparatus, such as using xerographic or ink-jet technology, and carrying out image-quality tests therein.

BACKGROUND

In color printing using digital printers, it is common to require occasional "calibration" of the printer. Generally this is done by causing the printer to output sheets bearing a series of "test patches," each patch representing a desired color. The test patches are then read by a spectrophotometer or similar image sensor, and the actual reflectance values of the patches are compared to the colors of the desired patches. In a high-speed, production context, it is known to provide image sensors immediately downstream of a printing apparatus for various purposes, as shown in U.S. Pat. Nos. 5,488,458; 6,324,353; and 6,684,035.

In practical operation, an image sensor used in combination with a printer must itself be calibrated occasionally. Sensor calibration usually involves exposing to the sensor a surface of known predetermined optical properties, such as a predetermined blackness or whiteness, and then adjusting the outputs of the image sensor accordingly. U.S. Pat. No. 6,198,536 shows a sheet scanner in which calibration targets can be slid underneath a spectrophotometer: a user manually slides the desired black or white calibration "backer" underneath the spectrophotometer as needed.

The present disclosure, in various embodiments, is directed to a system useful in calibrating image sensors, whether as part of a testing station downstream of a printing apparatus, within a scanner for recording hard-copy images, or for any other purpose.

SUMMARY

According to one aspect, there is provided an apparatus for optical analysis of images on sheets, comprising a structure forming a baffle for passage of a sheet therethrough, and a photosensor disposed to receive light reflected from a sheet passing through the baffle. A selectably-positionable target member has at least a first target surface associated therewith, and is positionable in a position establishing a width of the baffle suitable for passage of a sheet through the baffle, and a position wherein the first target surface is disposed adjacent to the photosensor.

According to another aspect, there is provided a printing apparatus comprising a print engine for outputting sheets. A structure is disposed downstream of the print engine along a process direction, forming a baffle for passage of a sheet therethrough. A photosensor is disposed to receive light reflected from a sheet passing through the baffle. A selectably-positionable target member has at least a first target surface associated therewith, and is positionable in a position establishing a width of the baffle suitable for passage of a sheet through the baffle, and a position wherein the first target surface is disposed adjacent to the photosensor.

According to another aspect, there is provided an apparatus for recording images on sheets. A structure forms a baffle for passage of a sheet therethrough. An image sensor is disposed to receive light reflected from a sheet passing through the baffle. A selectably-positionable target member has at least a first target surface associated therewith, and is positionable in a position establishing a width of the baffle suitable for passage of a sheet through the baffle, and a position wherein the first target surface is disposed adjacent to the image sensor.

DETAILED DESCRIPTION

Figure 1:
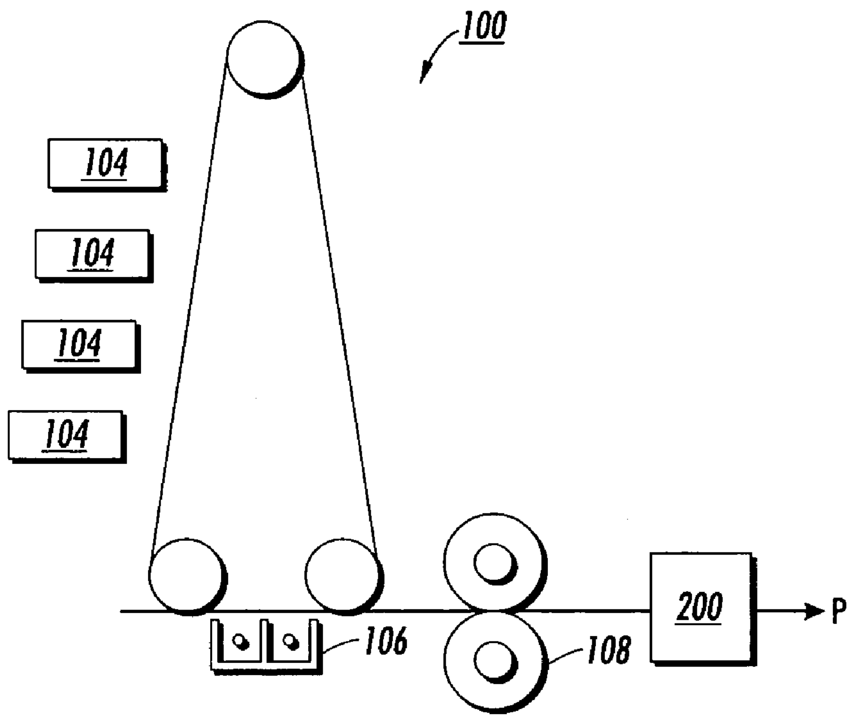
FIG. 1 is a simplified elevational view of a printing apparatus with a testing station associated therewith.

FIG. 1 is a simplified elevational view of a printing apparatus, in this case a production-speed xerographic printer. The print engine 100 is of a type generally familiar in the art: a photoreceptor 102 rotates past imaging stations 104, one imaging station for each CMYK primary color, and each including (not shown) a charge device, laser, and development unit. Each imaging station, controlled by digital data supplied thereto, places toner according to a color separation of a desired image on the photoreceptor 102, and the total color image is then transferred to a print sheet at transfer station 106. The print sheet then moves in a process direction P through a fusing station 108, and continues, at a constant velocity, past what can be called a "testing station" 200. Testing station 200 is positioned to read at least a strip of each sheet substantially immediately following fusing, fusing being considered in this embodiment the end of the printing process.

Figure 2:
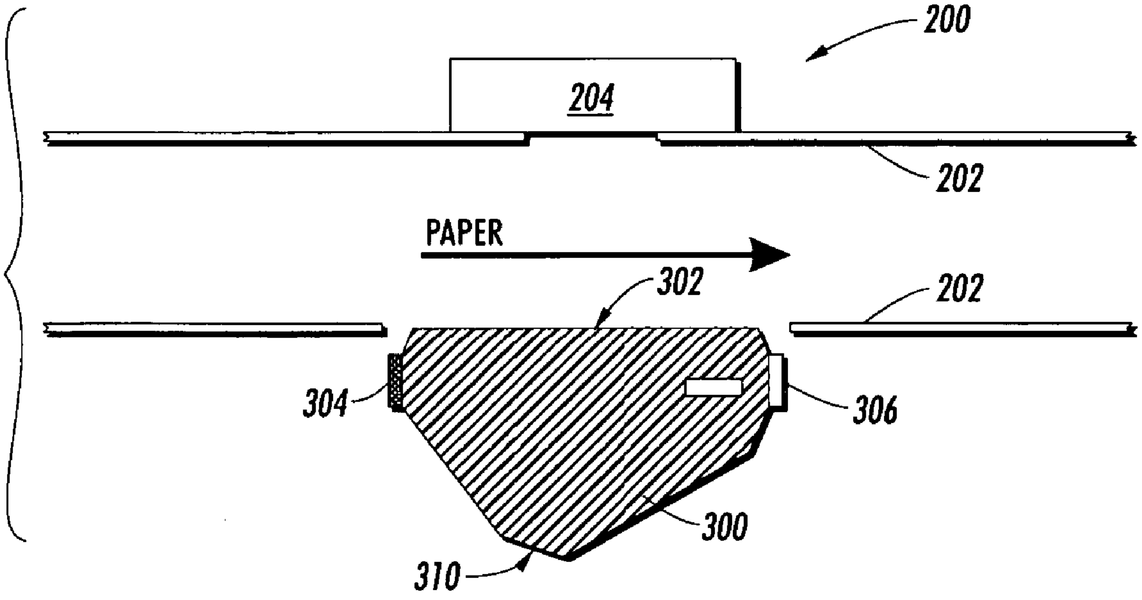
FIGS. 2, 3 and 4 are detailed elevational views of a testing station in different states, according to one embodiment.
Figure 3:
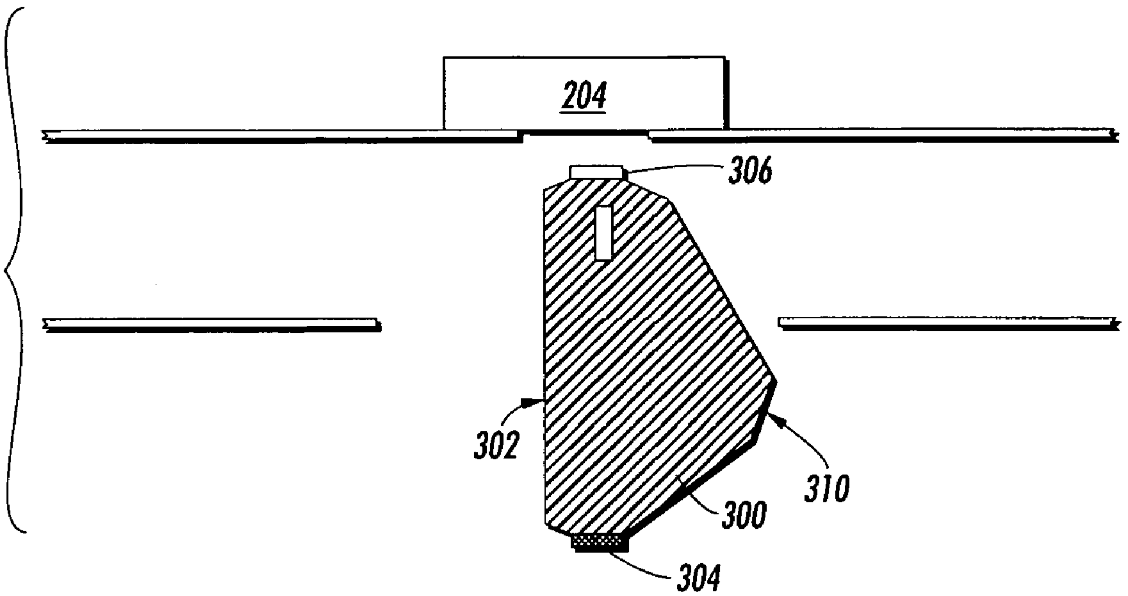
Figure 4:
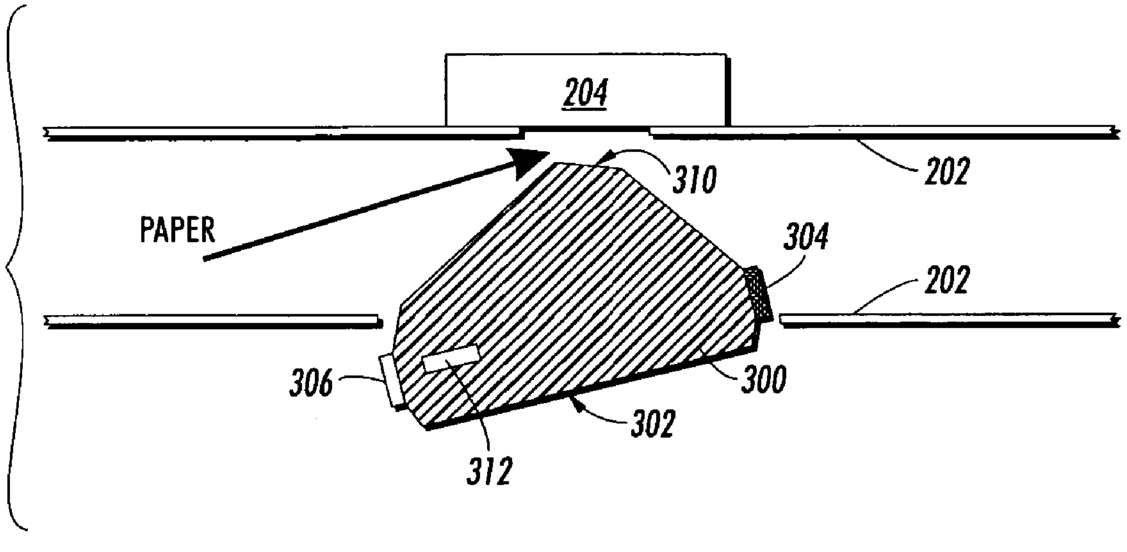

FIGS. 2, 3 and 4 are detailed elevational views of a testing station 200 in different states, according to one embodiment. Around the testing station 200 includes a structure 202, such as forming two opposing surfaces, forming a baffle through which a sheet emerging from fuser 108 can pass. Associated with one surface of the baffle is a photosensor 204, which may relate to a spectrophotometer or any other kind of optical detector. The photosensor 204, which may be associated with a light source (not shown), receives reflected light for various purposes from sheets moving therepast.

Opposite the photosensor 204 in the embodiment is a selectably-positionable "target member," generally indicated as 300. The member 300 is rotatably mounted (by a structure not shown) around an axis going into each Figure. The member 300 can extend a small distance (such as one inch) or across an entire width of a sheet path along its axis.

As shown, the member has a number of distinct surfaces around its "circumference," and thus can selectably present any one of these surfaces generally toward the photosensor 204 on the opposite side of baffle 202. One surface, regular surface 304 establishes a width of the baffle 202 suitable for passage of a sheet through the baffle 202 when oriented toward the photosensor 204, as shown in FIG. 2. A relatively wide width of the baffle 202 is useful when a printer is operating in a normal printing mode and constriction of the baffle 202 is to be avoided.

The member 300 in this embodiment includes two "target surfaces," indicated as 304 and 306. Target surfaces of various types are used to calibrate the photosensor 204 in various desired ways; typically, it is useful to hold the target surface a fixed, relatively close, distance form the photosensor. In FIG. 3, surface 306 is positioned relatively close to photosensor 204, and, in this case, the positioning substantially constricts the baffle 202. Similarly, target surface 304 can be positioned adjacent photosensor 204. As shown, target surface 304 is black and target surface 306 is white, as is commonly needed for purposes of calibrating the photosensor 204, although other predetermined optical properties may be employed for the target surfaces as needed.

FIG. 4 shows the member 300 oriented to provide a "sheet calibration surface" 310 relative to the photosensor 204. The function of a sheet calibration surface (which may define a plurality of distinctly-angled surfaces, as shown) is to guide a sheet passing through the baffle 202 relatively close to the photosensor 204 (compared to the open baffle provided by regular surface 302). As shown, a sheet passing through baffle 202 when sheet calibration surface 310 is adjacent photosensor 204 is guided to pass close to photosensor 204. Sheet calibration is used to determine precisely the optical properties of a sheet of a given type.

In a practical application of member 300 within a baffle 202, a width of the baffle (i.e., between the two structures indicated as 202 in FIG. 2) is about 2 mm. The regular surface 302 of member 300 may include ridges or ribs (not shown) at various locations along the length thereof, to aid in guiding sheets through the baffle 202. When a target surface 304 or 306 is directed toward the photosensor 204, the plane of the target surface should be as close to the top surface (as shown) of baffle 202 and read plane of photosensor 204 as possible, with a tolerance of ±0.25 mm, effectively closing off the baffle for passage of sheets therethrough. When calibration surface 310 is positioned to be adjacent photosensor 204, the "peak" of surface 310 should be as close to the top surface (as shown) of baffle 202 as possible, taking into account a required clearance for a sheet to pass over surface 310 and close to the read plane of photosensor 204, with a tolerance of ±0.50 mm.

Another aspect of member 300 in the embodiment is a "home sensor" 312, which is some kind of structure, such as a magnet or optically-readable mark, that interacts with some other structure (not shown) to provide feedback to a control system regarding the position of the member at a given time.

Figure 5:
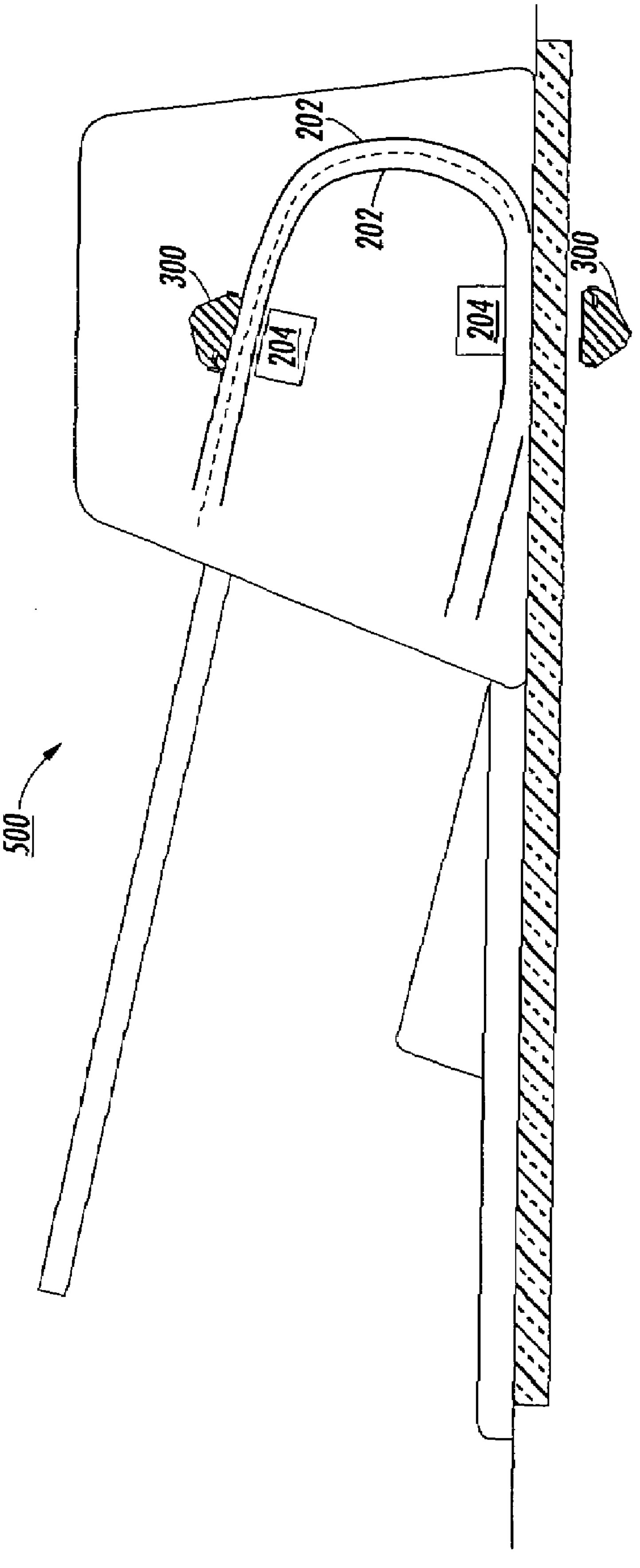
FIG. 5 is a simple elevational diagram of an image scanner with target members associated therewith.

FIG. 5 is a simple elevational diagram of an image scanner, generally indicated as 500, that can also utilize one or more selectably-positionable target members 300, such as described above. (In the Figures, like numbers indicate analogous structures.) In brief, image scanner 500 causes sheets bearing images to be recorded to move past one or more image sensors analogous to the photosensor 204 described above; in a practical application the each image sensor 204 effectively extends, possibly with associated optics, the width of a sheet moving in process direction P. Adjacent each image sensor 204 is a baffle 202 and target member 300, as described above. The target members 300 can be rotated as desired to assist in calibrating the respective associated image sensors 204.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. An apparatus for optical analysis of images on sheets, comprising:

a structure forming a baffle for passage of a sheet therethrough;

a photosensor disposed to receive light reflected from a sheet passing through the baffle;

a selectably-positionable target member, the target member having at least a first target surface associated therewith, the target member being positionable in a position establishing a width of the baffle suitable for passage of a sheet through the baffle, and a position wherein the first target surface is disposed adjacent to the photosensor.

2. The apparatus of claim 1, the target member further having a second target surface associated therewith, and the target member being further positionable in a position wherein the second target surface is disposed adjacent to the photosensor.

3. The apparatus of claim 2, the first target surface having a first predetermined optical property and the second target surface having a second predetermined optical property.

4. The apparatus of claim 1, the target member further having a sheet calibration surface associated therewith, and the target member being further positionable in a position wherein the sheet calibration surface causes a sheet passing through the baffle to pass close to the photosensor.

5. The apparatus of claim 4, the sheet calibration surface comprising a plurality of distinctly-angled surfaces for guiding the sheet passing through the baffle.

6. The apparatus of claim 1, the target member being rotatably mounted relative to the baffle.

7. An apparatus for recording images on sheets, comprising:

a structure forming a baffle for passage of a sheet therethrough;

an image sensor disposed to receive light reflected from a sheet passing through the baffle;

a selectably-positionable target member, the target member having at least a first target surface associated therewith, the target member being positionable in a position establishing a width of the baffle suitable for passage of a sheet through the baffle, and a position wherein the first target surface is disposed adjacent to the image sensor.

8. The apparatus of claim 7, the target member further having a second target surface associated therewith, and the target member being further positionable in a position wherein the second target surface is disposed adjacent to the image sensor.

9. The apparatus of claim 8, the first target surface having a first predetermined optical property and the second target surface having a second predetermined optical property.

10. The apparatus of claim 7, the target member further having a sheet calibration surface associated therewith, and the target member being further positionable in a position wherein the sheet calibration surface causes a sheet passing through the baffle to pass close to the image sensor.

11. The apparatus of claim 10, the sheet calibration surface comprising a plurality of distinctly-angled surfaces for guiding the sheet passing through the baffle.

* * * * *